(12) United States Patent
Zaliva

(10) Patent No.: US 8,797,288 B2
(45) Date of Patent: Aug. 5, 2014

(54) HUMAN USER INTERFACES UTILIZING INTERRUPTION OF THE EXECUTION OF A FIRST RECOGNIZED GESTURE WITH THE EXECUTION OF A RECOGNIZED SECOND GESTURE

(75) Inventor: Vadim Zaliva, Saratoga, CA (US)

(73) Assignee: Lester F. Ludwig, San Antonio, TX (US)

( * ) Notice: Subject to any disclaimer, the term of this patent is extended or adjusted under 35 U.S.C. 154(b) by 144 days.

(21) Appl. No.: 13/414,600

(22) Filed: Mar. 7, 2012

(65) Prior Publication Data

US 2012/0229398 A1 Sep. 13, 2012

Related U.S. Application Data

(60) Provisional application No. 61/449,923, filed on Mar. 7, 2011, provisional application No. 61/482,606, filed on May 4, 2011.

(51) Int. Cl.
*G06F 3/041* (2006.01)
(52) U.S. Cl.
USPC .......................................................... 345/173
(58) Field of Classification Search
USPC .......................................................... 345/173
See application file for complete search history.

(56) References Cited

U.S. PATENT DOCUMENTS

| | | | |
|---|---|---|---|
| 4,748,676 A | 5/1988 | Miyagawa | |
| 4,899,137 A | 2/1990 | Behrens et al. | |
| 5,237,647 A | 8/1993 | Roberts et al. | |
| 5,270,711 A | 12/1993 | Knapp | |
| 5,292,999 A | 3/1994 | Tumura | |
| 5,341,133 A | 8/1994 | Savoy | |
| 5,347,295 A | 9/1994 | Agulnick et al. | |
| 5,357,048 A | 10/1994 | Sgroi | |
| 5,378,850 A | 1/1995 | Tumura | |

(Continued)

FOREIGN PATENT DOCUMENTS

EP 0 574 213 B1 12/1993

OTHER PUBLICATIONS

Dulberg, M. S., et al. An Imprecise Mouse Gesture for the Fast Activation of Controls, IOS Press, Aug. 1999, [online] [retrieved on Jul. 9, 2013] URL: http://www.csc.ncsu.edu/faculty/stamant/papers/interact.pdf.gz, 10 pgs.

(Continued)

*Primary Examiner* — Aneeta Yodichkas
(74) *Attorney, Agent, or Firm* — Procopio, Cory, Hargreaves and Savitch LLP (57) ABSTRACT

A method is provided for a user interface recognizing the interruption of the execution of a first gesture with the execution of a second gesture. Measured information responsive to user interaction actions made by a user is received from a user interface sensor. At least one operation is applied to the measured information to produce a sequence of symbols or gestemes. The sequence of symbols is first used to determine that the user's execution of a first gesture has been interrupted. The sequence of symbols is used to determine that the user's execution of a second gesture has been started and completed resuming the first gesture. The sequence of symbols is used to determine that the user's execution a first gesture has been completed. Both the first and second gestures are recognized. Semantic content can be assigned to the existence of and various details regarding the interruption and gestures involved.

20 Claims, 6 Drawing Sheets

(56) References Cited

U.S. PATENT DOCUMENTS

| | | |
|---|---|---|
| 5,386,219 A | 1/1995 | Greanias |
| 5,420,936 A | 5/1995 | Fitzpatrick |
| 5,440,072 A | 8/1995 | Willis |
| 5,442,168 A | 8/1995 | Gurner et al. |
| 5,459,282 A | 10/1995 | Willis |
| 5,471,008 A | 11/1995 | Fujita et al. |
| 5,475,214 A | 12/1995 | DeFranco et al. |
| 5,565,641 A | 10/1996 | Gruenbaum |
| 5,585,588 A | 12/1996 | Tumura |
| 5,592,572 A | 1/1997 | Le |
| 5,592,752 A | 1/1997 | Fu |
| 5,659,145 A | 8/1997 | Weil |
| 5,659,466 A | 8/1997 | Norris et al. |
| 5,665,927 A | 9/1997 | Taki et al. |
| 5,668,338 A | 9/1997 | Hewitt et al. |
| 5,675,100 A | 10/1997 | Hewlett |
| 5,717,939 A | 2/1998 | Bricklin et al. |
| 5,719,347 A | 2/1998 | Masubachi et al. |
| 5,719,561 A | 2/1998 | Gonzales |
| 5,724,985 A | 3/1998 | Snell |
| 5,741,993 A | 4/1998 | Kushimiya |
| 5,748,184 A | 5/1998 | Shieh |
| 5,763,806 A | 6/1998 | Willis |
| 5,786,540 A | 7/1998 | Westlund |
| 5,801,340 A | 9/1998 | Peter |
| 5,805,137 A | 9/1998 | Yasutake |
| 5,824,930 A | 10/1998 | Ura et al. |
| 5,827,989 A | 10/1998 | Fay et al. |
| 5,841,428 A | 11/1998 | Jaeger et al. |
| 5,850,051 A | 12/1998 | Machover et al. |
| 5,852,251 A | 12/1998 | Su et al. |
| 5,889,236 A | 3/1999 | Gillespie et al. |
| 5,932,827 A | 8/1999 | Osborne et al. |
| 5,969,283 A | 10/1999 | Looney et al. |
| 5,977,466 A | 11/1999 | Muramatsu |
| 5,986,224 A | 11/1999 | Kent |
| 6,005,545 A | 12/1999 | Nishida et al. |
| 6,037,937 A | 3/2000 | Beaton et al. |
| 6,047,073 A | 4/2000 | Norris et al. |
| 6,051,769 A | 4/2000 | Brown, Jr. |
| 6,071,193 A * | 6/2000 | Suzuoki ............ 463/31 |
| 6,100,461 A | 8/2000 | Hewitt |
| 6,107,997 A | 8/2000 | Ure |
| 6,140,565 A | 10/2000 | Yamauchi et al. |
| 6,204,441 B1 | 3/2001 | Asahi et al. |
| 6,225,975 B1 | 5/2001 | Furuki et al. |
| 6,285,358 B1 | 9/2001 | Roberts |
| 6,288,317 B1 | 9/2001 | Willis |
| 6,310,279 B1 | 10/2001 | Suzuki et al. |
| 6,310,610 B1 | 10/2001 | Beaton et al. |
| 6,320,112 B1 | 11/2001 | Lotze |
| 6,323,846 B1 | 11/2001 | Westerman et al. |
| 6,360,019 B1 | 3/2002 | Chaddha |
| 6,363,159 B1 | 3/2002 | Rhoads |
| 6,373,475 B1 | 4/2002 | Challis |
| 6,392,636 B1 | 5/2002 | Ferrari |
| 6,392,705 B1 | 5/2002 | Chaddha |
| 6,400,836 B2 | 6/2002 | Senior |
| 6,404,898 B1 | 6/2002 | Rhoads |
| 6,408,087 B1 | 6/2002 | Kramer |
| 6,570,078 B2 | 5/2003 | Ludwig |
| 6,703,552 B2 | 3/2004 | Haken |
| 6,793,619 B1 | 9/2004 | Blumental |
| 7,030,860 B1 | 4/2006 | Hsu et al. |
| 7,408,108 B2 | 8/2008 | Ludwig |
| 7,557,797 B2 | 7/2009 | Ludwig |
| 7,598,949 B2 | 10/2009 | Han |
| 7,611,409 B2 | 11/2009 | Muir et al. |
| 8,154,529 B2 | 4/2012 | Sleeman |
| 8,169,414 B2 | 5/2012 | Lim |
| 8,170,346 B2 | 5/2012 | Ludwig |
| 8,179,376 B2 | 5/2012 | Griffin |
| 8,345,014 B2 | 1/2013 | Lim |
| 2001/0036299 A1 | 11/2001 | Senior |
| 2002/0005108 A1 | 1/2002 | Ludwig |
| 2002/0093491 A1 | 7/2002 | Gillespie et al. |
| 2004/0074379 A1 | 4/2004 | Ludwig |
| 2004/0118268 A1 | 6/2004 | Ludwig |
| 2004/0251402 A1 | 12/2004 | Reime |
| 2005/0078085 A1* | 4/2005 | Casebolt et al. ............ 345/156 |
| 2006/0252530 A1 | 11/2006 | Oberberger et al. |
| 2007/0044019 A1 | 2/2007 | Moon |
| 2007/0063990 A1 | 3/2007 | Park |
| 2007/0216641 A1* | 9/2007 | Young et al. ............ 345/156 |
| 2007/0229477 A1 | 10/2007 | Ludwig |
| 2008/0010616 A1 | 1/2008 | Algreatly |
| 2008/0055263 A1* | 3/2008 | Lemay et al. ............ 345/173 |
| 2008/0122796 A1* | 5/2008 | Jobs et al. ............ 345/173 |
| 2008/0143690 A1 | 6/2008 | Jang |
| 2008/0164076 A1 | 7/2008 | Orsley |
| 2008/0259053 A1 | 10/2008 | Newton |
| 2008/0297482 A1 | 12/2008 | Weiss |
| 2008/0300055 A1 | 12/2008 | Lutnick |
| 2008/0309634 A1 | 12/2008 | Hotelling et al. |
| 2009/0002333 A1* | 1/2009 | Maxwell et al. ............ 345/173 |
| 2009/0006292 A1 | 1/2009 | Block |
| 2009/0027351 A1 | 1/2009 | Zhang et al. |
| 2009/0124348 A1 | 5/2009 | Yoseloff et al. |
| 2009/0146968 A1 | 6/2009 | Narita et al. |
| 2009/0167701 A1 | 7/2009 | Ronkainen |
| 2009/0254869 A1 | 10/2009 | Ludwig |
| 2010/0013860 A1 | 1/2010 | Mandella |
| 2010/0044121 A1 | 2/2010 | Simon |
| 2010/0060607 A1 | 3/2010 | Ludwig |
| 2010/0079385 A1 | 4/2010 | Holmgren |
| 2010/0087241 A1 | 4/2010 | Nguyen et al. |
| 2010/0090963 A1 | 4/2010 | Dubs |
| 2010/0110025 A1 | 5/2010 | Lim |
| 2010/0117978 A1 | 5/2010 | Shirado |
| 2010/0177118 A1 | 7/2010 | Sytnikov |
| 2010/0231612 A1 | 9/2010 | Chaudhri et al. |
| 2010/0232710 A1 | 9/2010 | Ludwig |
| 2010/0289754 A1 | 11/2010 | Sleeman et al. |
| 2010/0302172 A1 | 12/2010 | Wilairat |
| 2010/0328032 A1 | 12/2010 | Rofougaran |
| 2011/0007000 A1 | 1/2011 | Lim |
| 2011/0037735 A1 | 2/2011 | Land |
| 2011/0063251 A1 | 3/2011 | Geaghan |
| 2011/0086706 A1 | 4/2011 | Zalewski |
| 2011/0202889 A1 | 8/2011 | Ludwig |
| 2011/0202934 A1 | 8/2011 | Ludwig |
| 2011/0260998 A1 | 10/2011 | Ludwig |
| 2011/0261049 A1 | 10/2011 | Cardno et al. |
| 2011/0285648 A1 | 11/2011 | Simon et al. |
| 2012/0007821 A1 | 1/2012 | Zaliva |
| 2012/0034978 A1 | 2/2012 | Lim |
| 2012/0050185 A1* | 3/2012 | Davydov et al. ............ 345/173 |
| 2012/0056846 A1 | 3/2012 | Zaliva |
| 2012/0108323 A1 | 5/2012 | Kelly et al. |
| 2012/0192119 A1 | 7/2012 | Zaliva |
| 2012/0194461 A1 | 8/2012 | Lim |
| 2012/0194462 A1 | 8/2012 | Lim |
| 2012/0195522 A1 | 8/2012 | Ludwig |
| 2012/0223903 A1 | 9/2012 | Ludwig |
| 2012/0235940 A1 | 9/2012 | Ludwig |
| 2012/0262401 A1 | 10/2012 | Rofougaran |
| 2012/0280927 A1 | 11/2012 | Ludwig |
| 2012/0317521 A1 | 12/2012 | Ludwig |
| 2013/0009896 A1 | 1/2013 | Zaliva |
| 2013/0038554 A1 | 2/2013 | West |

OTHER PUBLICATIONS

Moyle, M., et al. A Flick in the Right Direction: A Case Study of Gestural Input, Conferences in Research and Practice in Information Technology, vol. 18, Jan. 2005; New Zealand, [online] [retrieved on Jul. 9, 2013] URL:http://www.cosc.canterbury.ac.nz/andrew.cockburn/papers/moyle-cockburn.pdf, 27 pgs.

Maltoni, D., et al., "Handbook of Fingerprint Recognition," Springer Professional Computing, 2nd ed. 2009, XVI, p. 74, p. 361, [online] [retrieved on Jul. 9, 2013] URL: http://books.google.com/books?id=1Wpx25D8qOwC&pg=PA361&lpg=PA361&dq=fingerprint+minutiae, 2 pgs.

(56) References Cited

OTHER PUBLICATIONS

VeriFinger Information, [online] [retrieved on Jun. 11, 2013] URL: http://www.fingerprint-it.com/_sol_verifinger.html, 2 pgs.
Prabhakar S., et al., Learning fingerprint minutiae location and type, Pattern Recognition 2003, 36, [online] URL: http://www.cse.msu.edu/biometrics/Publications/Fingerprint/PrabhakarJainPankanti_MinaLocType_PR03.pdf, pp. 1847-1857.
Garcia Reyes, E., An Automatic Goodness Index to Measure Fingerprint Minutiae Quality, Progress in Pattern Recognition, Image Analysis and Applications, Lecture Notes in Computer Science vol. 3773, 2005, pp. 578-585, [online] [retrieved on Jun. 2, 2013] URL: http://www.researchgate.net/publication/226946511_An_Automatic_Goodness_Index_to_Measure_Fingerprint_Minutiae_Quality/file/d912f50ba5e96320d5.pdf.
Kayaoglu, M., et al., Standard Fingerprint Databases: Manual Minutiae Labeling and Matcher Performance Analyses, arXiv preprint arXiv:1305.1443, 2013, 14 pgs, [online] [retrieved on Jun. 2, 2013] URL: http://arxiv.org/ftp/arxiv/papers/1305/1305.1443.pdf.
Alonso-Fernandez, F., et al., Fingerprint Recognition, Chapter 4, Guide to Biometric Reference Systems and Performance Evaluation, (Springer, London, 2009, pp. 51-90, [online] [retrieved on Jun. 2, 2013] URL: http://www2.hh.se/staff/josef/public/publications/alonso-fernandez09chapter.pdf.
Image moment, Jul. 12, 2010, 3 pgs, [online] [retrieved on Jun. 13, 2013] URL: http://en.wikipedia.org/wiki/Image_moment.
Nguyen, N., et al., Comparisons of sequence labeling algorithms and extensions, Proceedings of the 24th International Conference on Machine Learning, 2007, [online] [retrieved on Jun. 2, 2013] URL: http://www.cs.cornell.edu/~nhnguyen/icml07structured.pdf, pp. 681-688.
Nissen, S., Implementation of a Fast Artificial Neural Network Library (FANN), Department of Computer Science University of Copenhagen (DIKU)}, Oct. 31, 2003, [online] [retrieved on Jun. 21, 2013] URL: http://mirror.transact.net.au/sourceforge/f/project/fa/fann/fann_doc/1.0/fann_doc_complete_1.0.pdf, 92 pgs.
Igel, C., et al., Improving the Rprop Learning Algorithm, Proceedings of the Second International ICSC Symposium on Neural Computation (NC 2000), 2000, 2000, [online] [retrieved on Jun. 2, 2013] URL: http://citeseerx.ist.psu.edu/viewdoc/download?doi=10.1.1.17.3899&rep=rep1&type=pdf, pp. 115-121.
Bishop, C.M., Pattern Recognition and Machine Learning, Springer New York, 2006, pp. 561-593.
Euler Angles, 2011, [online] [retrieved on Jun. 30, 2011] URL: http://en.wikipedia.org/w/index.php?title=Euler_angles&oldid=436460926, 8 pgs.
Electronic Statistics Textbook, StatSoft, Inc., 2011, [online] [retrieved on Jul. 1, 2011] URL: http://www.statsoft.com/textbook, 1 pg.
Central Moment, Dec. 16, 2009, [online] [retrieved on Oct. 26, 2010] URL: http://en.wikipedia.org/w/index.php?title=Central_moment&oldid=332048374.
Local regression, Nov. 16, 2010, [online] [retrieved on Jun. 28, 2011] URL: http://en.wikipedia.org/w/index.php?title=Local_regression&oldid=416762287.
USPTO Notice of Allowance dated Jun. 6, 2013 issued in U.S. Appl. No. 13/846,830, filed Mar. 18, 2013.
Hernandez-Leon, R., et al., Classifying using Specific Rules with High Confidence, 9th Mexican International Conference on Artificial Intelligence, IEEE, Nov. 2010, pp. 75-80.
Fang, Y., et al., Dynamics of a Winner-Take-All Neural Network, Neural Networks, 9(7), Oct. 1996, pp. 1141-1154.
Moog, R. A., The Human Finger—A Versatile Electronic Music Instrument Component, Audio Engineering Society Preprint, 1977, New York, NY, 4 pgs.
Johnson, C., Image sensor tracks moving objects in hardware, Electronic Engineering Times, Apr. 5, 1999, 1 pg.
Kaoss pad dynamic effect/controller, Korg Preview Users' magazine Summer 1999, 2 pgs.
Leiberman, D., Touch screens extend grasp Into consumer realm, Electronic Engineering Times, Feb. 8, 1999.
Lim, et al., A Fast Algorithm for Labelling Connected Components in Image Arrays, Technical Report Series, No. NA86-2, Thinking Machines Corp., 1986 (rev. 1987), Cambridge, Mass., USA , 17 pgs.
Pennywitt, K., Robotic Tactile Sensing, Byte, Jan. 1986, 14 pgs.
Review of KORG X-230 Drum (later called Wave Drum ), Electronic Musician, Apr. 1994, 1 pg.
Rich, R., Buchla Lightning MIDI Controller, Electronic Musician, Oct. 1991, 5 pgs.
Rich, R., Buchla Thunder, Electronic Musician, Aug. 1990, 4 pgs.
Dario P., et al., Tactile sensors and the gripping challenge, IEEE Spectrum, vol. 5, No. 22, Aug. 1985, pp. 46-52.
Snell, J. M., Sensors for Playing Computer Music with Expression, Proceedings of the Intl. Computer Music Conf. at Eastman, 1983, pp. 113-126.
Verner J., Artif Starr Switch Company Ztar 624-D, Electronic Musician, Nov. 1994, 5 pgs.
Haken, L., An Indiscrete Music Keyboard, Computer Music Journal, Spring 1998, pp. 30-48.
USPTO Notice of Allowance dated May 8, 2013 issued in U.S. Appl. No. 12/541,948, filed Aug. 15, 2009.
Buxton, W. A. S., Two-Handed Document Navigation, XEROX Disclosure Journal, 19(2), Mar./Apr. 1994 [online] [retreived on May 28, 2013] URL: http://www.billbuxton.com/2Hnavigation.html, pp. 103-108.
USPTO Notice of Allowance dated Mar. 20, 2012 issued in U.S. Appl. No. 12/724,413, filed Mar. 15, 2010.
USPTO Notice of Allowance dated Jan. 10, 2008 issued in U.S. Appl. No. 10/683,914, filed Oct. 10, 2003.
USPTO Notice of Allowance dated Nov. 9, 2012 issued in U.S. Appl. No. 12/502,230, filed Jul. 13, 2009.
USPTO Notice of Allowance dated Mar. 12, 2012 issued in U.S. Appl. No. 12/511,930, filed Jul. 29, 2009.
USPTO Notice of Allowance dated May 16, 2013 issued in U.S. Appl. No. 13/441,842, filed Apr. 7, 2012.
USPTO Notice of Allowance dated May 24, 2013 issued in U.S. Appl. No. 13/442,815, filed Apr. 9, 2012.
USPTO Notice of Allowance dated Dec. 24, 2002 issued in U.S. Appl. No. 09/812,870, filed Mar. 19, 2001.
Otsu's method, [online] [retrieved on Jun. 26, 2013] URL: http://en.wikipedia.org/wiki/Otsu_method, Sep. 13, 2010, 2 pgs.
Principal component analysis, [online] [retrieved on Jun. 26, 2013] URL: http://en.wikipedia.org/wiki/Principal_component_analysis, Feb. 25, 2011, 9 pgs.
USPTO Notice of Allowance dated May 30, 2013 issued in U.S. Appl. No. 13/442,806, filed Apr. 9, 2012.
DIY Touchscreen Analysis, MOTO, [online] [retrieved on May 12, 2013] URL: http://labs.moto.com/diy-touchscreen-analysis/, Jul. 15, 2010, 23 pgs.
Wilson, T.V., How the iPhone Works, howstuffworks, [online] [retrieved on May 12, 2013] URL: http://electronics.howstuffworks.com/iphone2.htm, Jan. 8, 2011, 11 pgs.
Walker, G., Touch and the Apple iPhone, Veritas et Visus, [online] [retrieved on May 12, 2013] URL: http://www.veritasetvisus.com/VVTP-12,%20Walker.pdf, Feb. 2007, pp. 50-54.
Han, J., Multi-Touch Sensing through LED Matrix Displays (video), [online] [retrieved on May 12, 2013] "http://cs.nyu.edu/~jhan/ledtouch/index.html," Feb. 18, 2011, 1 pg.
Roberts Cross, [online] [retrieved on May 12, 2013] URL: http://en.wikipedia.org/wiki/Roberts_Cross, Jul. 20, 2010, visited Feb. 28, 2011, 3 pgs.
Sobel Operator, [online] [retrieved on May 12, 2013] URL: http://en.wikipedia.org/wiki/Sobel_operator, Mar. 12, 2010, visited Feb. 28, 2011, 5 pgs.
Prewitt, [online] [retrieved on May 12, 2013] URL: http://en.wikipedia.org/wiki/Prewitt, Mar. 15, 2010, visited Feb. 28, 2011, 2 pgs.
Coefficient of variation, [online] [retrieved on May 12, 2013] URL: http://en.wikipedia.org/wiki/Coefficient_of_variation, Feb. 15, 2010, visited Feb. 28, 2011, 2 pgs.
Canny edge detector, [online] [retrieved on May 12, 2013] http://en.wikipedia.org/wiki/Canny_edge_detector, Mar. 5, 2010, 4 pgs.

(56) References Cited

OTHER PUBLICATIONS

Polynomial regression, [online] [retrieved on May 12, 2013] URL: http://en.wikipedia.org/wiki/Polynomial_regression, Jul. 24, 2010, 4 pgs.

Pilu, M., et al., Training PDMs on models: The Case of Deformable Superellipses, Proceedings of the 7th British Machine Vision Conference, Edinburgh, Scotland, 1996, pp. 373-382, [online] [retrieved on Feb. 28, 2011] URL: https://docs.google.com/viewera=v&pid=explorer&chrome=true&srcid=0BxWzm3JBPnPmNDl1MDlxZGUtNGZhZi00NzJhLWFhZDMtNTJmYmRiMWYyMjBh&authkey=CPeVx4wO&hl=en.

Osian, M., et. al., Fitting Superellipses to Incomplete Contours, IEEE Computer Society Conference on Computer Vision and Pattern Recognition Workshops (CVPRW '04), Jun. 2004, 8 pgs.

Hough transform, [online] [retrieved on Feb. 13, 2010] URL: http://en.wikipedia.org/wiki/Hough_transform, Feb. 13, 2010, 7 pgs.

Tactile Pressure Measurement, Pressure Mapping Systems, and Force Sensors and Measurement Systems, [online] [retrieved on Aug. 6, 2013] URL: http://www.tekscan.com, 2 pgs.

Tactile Surface Pressure and Force Sensors, Sensor Products LLC, Oct. 26, 2006, [online] [retrieved on Aug. 6, 2013] URL: http://www.sensorprod.com, 2 pgs.

Pressure Profile Systems, Jan. 29, 2011, [online] [retrieved on Jan. 29, 2011] URL: http://www.pressureprofile.com, 1 pg.

Xsensor Technology Corporation, Feb. 7, 2011, [online] [retrieved on May 12, 2013] URL: http://www.xsensor.com, 1 pg.

Balda AG, Feb. 26, 2011, [online] [retrieved on May 12, 2013] URL: http://www.balda.de, 1 pg.

Cypress Semiconductor, Feb. 28, 2011, [online] [retrieved on May 12, 2013] URL: http://www.cypress.com, 1 pg.

Synaptics, Jan. 28, 2011, [online] [retrieved on May 12, 2013] URL: http://www.synaptics.com, 1 pg.

Venolia, D., et al., T-Cube: A Fast, Self-Disclosing Pen-Based Alphabet, CHI '94 Proceedings of the SIGCHI Conference on Human Factors in Computing Systems, Apr. 24-28, 1994, pp. 265-270.

Davis, R. C., et al., NotePals: Lightweight Note Taking by the Group, for the Group, University of California, Berkeley, Computer Science Division, 1998, 8 pgs.

Rekimoto, Jun, Pick-and-Drop: A Direct Manipulation Technique for Multiple Computer Environments, Sony Computer Science Laboratory Inc., Tokyo, Japan, 1997, [online] [retrieved on May 30, 2013] URL: http://www.sonycsl.co.jp/person/rekimoto/papers/uist97.pdf, 8 pgs.

Davis, R. C., et al., NotePals: Lightweight Note Sharing by the Group, for the Group, [online] [retrieved on Jun. 2, 2013] URL: http://dub.washington.edu:2007/projects/notepals/pubs/notepals-chi99-final.pdf, 9 pgs.

Want, R., et al., The PARCTAB ubiquitous computing experiment, 1995-1996, [online] [retrieved on Jun. 10, 2013] URL: http://www.ece.rutgers.edu/~parashar/Classes/02-03/ece572/perv-reading/the-parctab-ubiquitous-computing.pdf, 44 pgs.

Viberg, M., Subspace Fitting Concepts in Sensor Array Processing, Department of Electrical Engineering, Linkoping University, 1989, Sweden, 15 pgs.

\* cited by examiner

$G^P = \boxed{G^X \mid G^Y \mid G^Z}$

Figure 5

$G^Q = \boxed{g_a \mid g_b \mid g_c \mid g_d \mid g_e}$

HUMAN USER INTERFACES UTILIZING INTERRUPTION OF THE EXECUTION OF A FIRST RECOGNIZED GESTURE WITH THE EXECUTION OF A RECOGNIZED SECOND GESTURE

CROSS REFERENCE TO RELATED APPLICATIONS

Pursuant to 35 U.S.C. §119(e), this application claims benefit of priority from Provisional Patent Application Ser. No. 61/449,923, filed Mar. 7, 2011, and Provisional Patent Application Ser. No. 61/482,606, filed May 4, 2011, the contents of each of which are hereby incorporated by reference herein in their entirety.

COPYRIGHT & TRADEMARK NOTICES

A portion of the disclosure of this patent document may contain material, which is subject to copyright protection. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

BACKGROUND OF THE INVENTION

Field of the Invention

The invention pertains to human user interfaces for computing and other devices, and more specifically to those utilizing the interruption of the execution of a first gesture with the execution of a second gesture and then resuming and completing the first gesture.

BRIEF DESCRIPTION OF THE DRAWINGS

The above and other aspects, features and advantages of the present invention will become more apparent upon consideration of the following description of preferred embodiments taken in conjunction with the accompanying drawing figures, wherein.

DETAILED DESCRIPTION

In the following description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention.

In the following description, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

For purposes of summarizing, certain aspects, advantages, and novel features are described herein. Not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In an aspect of the invention, the interruption of the execution of a first gesture with the execution of a second gesture and then resuming and completing the first gesture is recognized.

In another aspect of the invention, a partially-executed gesture can be recognized as such and information regarding the partially-executed gesture (as measured and/or subsequently-interpreted) is stored.

In another aspect of the invention, should the partially-executed gesture be resumed, the stored information regarding the partially-executed gesture is used in the recognition of the completed form of the previously partially-executed gesture.

In another aspect of the invention, should the partially-executed gesture not be resumed, the stored information regarding the partially-executed gesture is deleted.

In another aspect of the invention, should the partially-executed gesture not be resumed within a pre-determined length of time, the stored information regarding the partially-executed gesture is deleted.

In another aspect of the invention, the interruption of the execution of a first gesture with the execution of a second gesture and then resuming and completing the first gesture is not used to convey semantic content.

In another aspect of the invention, the interruption of the execution of a first gesture with the execution of a second gesture and then resuming and completing the first gesture is used to convey semantic content.

In another aspect of the invention, the point of the interruption within the trajectory of the first gesture is not used to convey semantic content.

In another aspect of the invention, the point of the interruption within the trajectory of the first gesture is used to convey semantic content.

In another aspect of the invention, the point of the interruption within the gesteme sequence of the first gesture is not used to convey semantic content.

In another aspect of the invention, the point of the interruption within the gesteme sequence of the first gesture is used to convey semantic content.

In another aspect of the invention, the combination of the first gesture and the second gesture is not used to convey additional semantic content beyond that of the first gesture and the second gesture in isolation.

In another aspect of the invention, the combination of the first gesture and the second gesture is used to convey additional semantic content beyond that of the first gesture and the second gesture in isolation.

In another aspect of the invention, the combination of the first gesture, the second gesture, and the location of the interruption within the first gesture is used to convey additional semantic content beyond that of the first gesture and the second gesture in isolation.

In another aspect of the invention, a specific gesture comprises a particular predefined sequence of recognized gestemes.

In another aspect of the invention, a recognized gesteme comprises a symbol produced by one or more threshold test(s) applied to one or more measured or calculated value(s) responsive to a user interface sensor.

In another aspect of the invention, a recognized gesteme comprises a sequence of symbols produced by one or more threshold test(s) applied to one or more measured or calculated value(s) responsive to a user interface sensor.

In another aspect of the invention, a recognized gesteme comprises a symbol produced by a state machine, the state machine responsive to a sequence of symbols produced by one or more threshold test(s) applied to one or more measured or calculated value(s) responsive to a user interface sensor.

In another aspect of the invention, a recognized gesteme is determined by the outcome of a vector quantizer applied to one or more measured or calculated value(s) responsive to a user interface sensor.

In another aspect of the invention, a recognized gesteme is determined by the outcome of a matched filter applied to one or more measured or calculated value(s) responsive to a user interface sensor.

In another aspect of the invention, an extension of the afore-described arrangements wherein the execution of a first predefined gesture is interrupted, a sequence of a plurality of other predefined gestures are then fully executed, and the execution of the first predefined gesture is resumed and completed.

In an aspect of the invention, a method is provided for a user interface recognizing the interruption of the execution of a first gesture with the execution of a second gesture, the method comprising:

Receiving measured information from a user interface sensor, the measured information responsive to user interaction actions made by a user;

Applying at least one operation to the measured information to produce a sequence of gestemes, each gesteme produced by the at least one operation responsive to an associated portion of a user interaction actions made by the user;

Determining from the sequence of gestemes that the user's execution of a first gesture has been interrupted;

Determining from the sequence of gestemes that the user's execution of a second gesture has been started and completed before the first gesture has been resumed; and Determining from the sequence of gestemes that the user's execution of a first gesture has been completed;

wherein the first gesture is recognized and the second gesture is recognized.

In an aspect of the invention, a method is provided for a user interface recognizing the interruption of the execution of a first gesture with the execution of a second gesture, the method comprising:

Receiving measured information from a user interface sensor, the measured information responsive to user interaction actions made by a user;

Applying at least one operation to the measured information to produce a sequence of symbols, each symbol produced by the at least one operation responsive to an associated portion of a user interaction actions made by the user;

Determining from the sequence of symbols that the user's execution of a first gesture has been interrupted;

Determining from the sequence of symbols that the user's execution of a second gesture has been started and completed before the first gesture has been resumed; and Determining from the sequence of symbols that the user's execution of a first gesture has been completed;

wherein the first gesture is recognized and the second gesture is recognized.

Certain embodiments of the invention provide a user interface recognizing the interruption of the execution of a first gesture with the execution of a second gesture. Measured information responsive to user interaction actions made by a user is received from a user interface sensor. At least one operation is applied to the measured information to produce a sequence of symbols or gestemes. The sequence of symbols is first used to determine that the user's execution a first gesture has been interrupted. The sequence of symbols is next used to determine that the user's execution a second gesture has been started and completed before the first gesture has been resumed. The sequence of symbols is used to first determine that the user's execution a first gesture has been completed.

Both the first gesture and the second gesture are recognized. Semantic content can be assigned to the existence of and various details regarding the interruption and gestures involved.

Certain embodiments of the invention can be used with simple touch interface systems found in handheld devices, laptops, and other mobile devices as well as sophisticated touch interface systems such as the High Dimensional Touch Pad (HDTP) and other high-dimensional gesture user interface arrangements taught in U.S. Pat. No. 6,570,078, U.S. patent application Ser. No. 11/761,978, and U.S. patent application Ser. No. 12/418,605.

1. Gesture Definitions, Executions, and Renderings in Measured Signal Space

The notion of touch postures and gestures are taught in U.S. Pat. No. 6,570,078 and U.S. patent application Ser. No. 11/761,978. A touch posture can be viewed as a recognized tactile image pattern (for example as measured by a touch sensor). A touch gesture can be viewed as a time-varying tactile image pattern with recognized dynamic changes over time (such as a finger flick, single-finger double-tap, etc.). U.S. Pat. No. 6,570,078 and U.S. patent application Ser. No. 11/761,978 extend these notions from touch sensors to include gestures rendered as verbal hand signals (for example as measured by a video camera) as well as, for example, facial expressions and lip movements.

In one view, then, a gesture as measured by an associated sensor can be represented as a time-varying pattern or trajectory in a measured signal space. From the user experience viewpoint, then, a gesture is rendered by the user as a time-varying pattern or trajectory of movement in the physical space measured or observed by the user interface sensor.

For example, a touch-based finger flick, wherein a finger contact pattern starts in a first (initiating) measured location on a touch surface, and moves remaining in contact with the touch surface to a second (terminating) measured location within a predefined minimum interval of time, creates a corresponding trajectory in measured signal space.

Figure 1A:
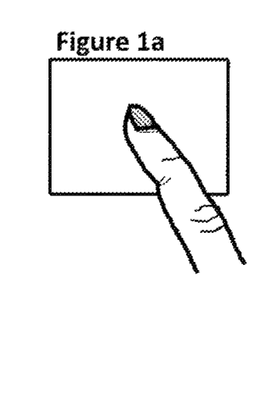
FIG. 1a through FIG. 1c depict representations of an example touch-based single-finger "finger-flick" gesture, wherein a finger makes physical contact begins in a first (initiating) location on a touch surface, and moves remaining in contact with the touch surface roughly along a straight-line to a second (terminating) location within a predefined minimum interval of time.
Figure 1B:
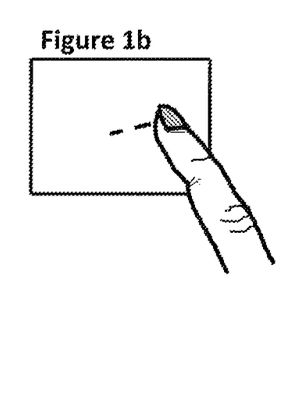
Figure 1C:
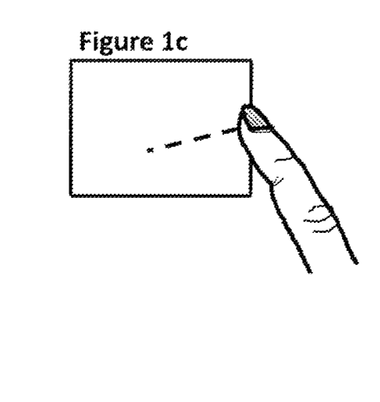
Figure 2A:
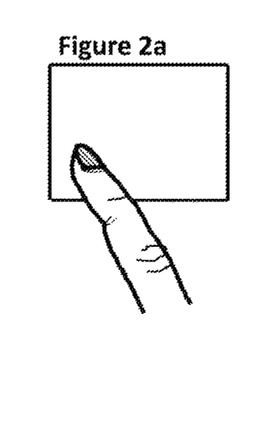
FIG. 2a through FIG. 2c depict representations of an example touch-based single-finger hook-shaped gesture, wherein a finger makes physical contact begins in a first (initiating) location on a touch surface, and moves remaining in contact with the touch surface in along hook-shaped path to a second (terminating) location within a predefined minimum interval of time.
Figure 2B:
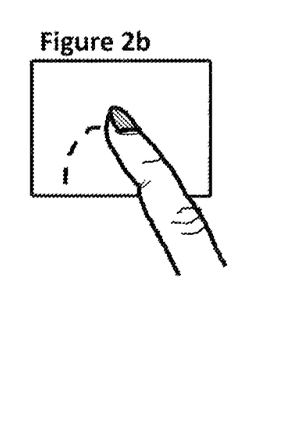
Figure 2C:
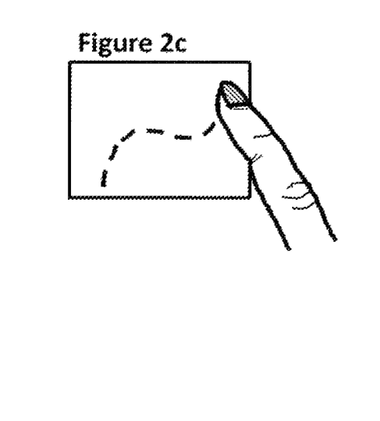

As an example, FIG. 1a through FIG. 1c depict representations of an example touch-based single-finger "finger flick" gesture, wherein a finger makes physical contact begins in a first (initiating) location on a touch surface, and moves remaining in contact with the touch surface to a second (terminating) location roughly along a straight-line path within a predefined minimum interval of time. As another example, FIG. 2a through FIG. 2c depict representations of an example touch-based single-finger hook-shaped gesture, wherein a finger makes physical contact begins in a first (initiating) location on a touch surface, and moves remaining in contact with the touch surface along hook-shaped path to a second (terminating) location within a predefined minimum interval of time.

Figure 3:
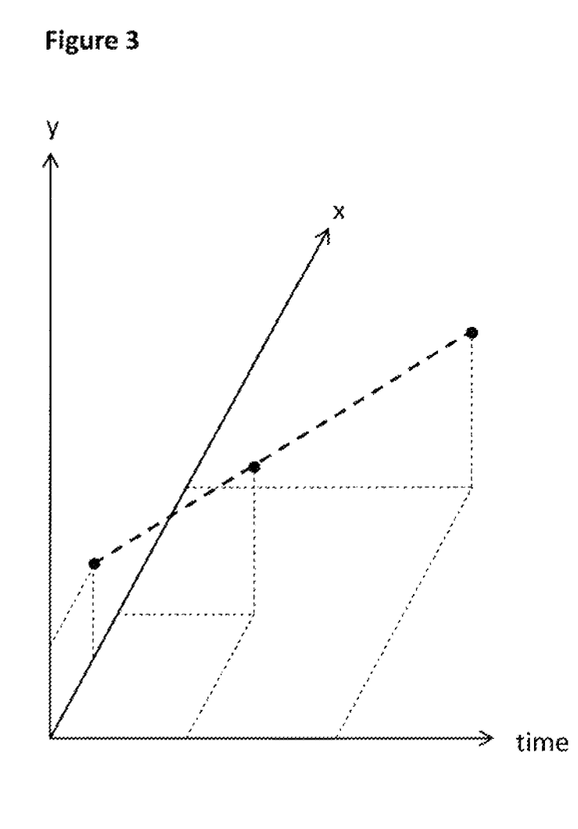
FIG. 3 depicts an example signal-space representation of the single-finger "finger-flick" gesture represented by FIG. 1a through FIG. 1c, wherein a signal-space trajectory starts in a first (initiating) signal-space location and changes values to a second (terminating) signal-space location within a predefined minimum interval of time.
Figure 4:
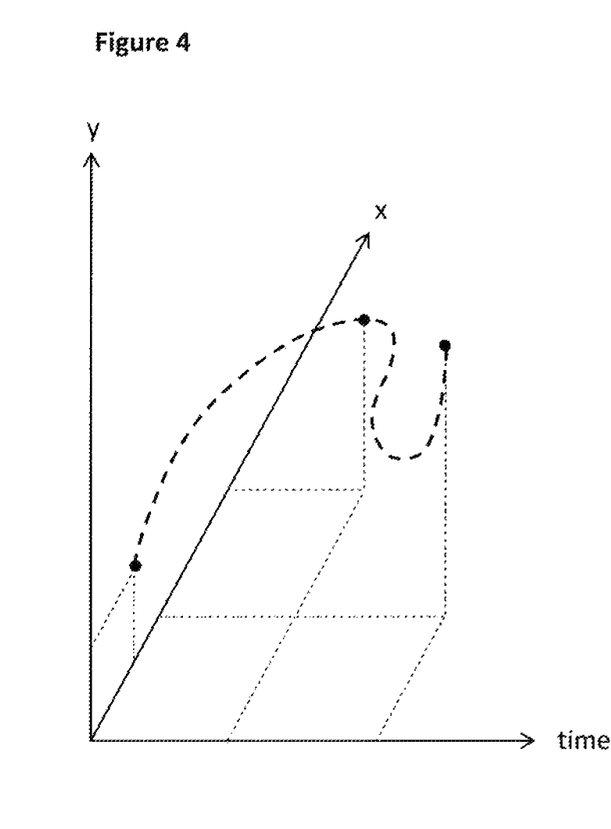
FIG. 4 depicts an example signal-space representation of the single-finger hook-shaped gesture represented by FIG. 2a through FIG. 2c, wherein a signal-space trajectory starts in a first (initiating) signal-space location and changes values to a second (terminating) signal-space location within a predefined minimum interval of time.

FIG. 3 depicts an example signal-space representation of the single-finger "finger-flick" gesture represented by FIG. 1a through FIG. 1c, wherein a signal-space trajectory starts in a first (initiating) signal-space location and changes values to a second (terminating) signal-Space location within a predefined minimum interval of time. Similarly, FIG. 4 depicts an example signal-space representation of the single-finger hook-shaped gesture represented by FIG. 2a through FIG. 2c, wherein a signal-space trajectory starts in a first (initiating) signal-space location and changes values to a second (terminating) signal-space location within a predefined minimum interval of time.

The concepts of represented in FIG. 1a through FIG. 1c, FIG. 2a through FIG. 2c, FIG. 3, and FIG. 4, are purely simple representative examples readily more generally extended to comprise more dimensions, parameters, and/or other types of measurements or values calculated from measured values for arbitrary sensors, gesture actions, and signal spaces. Accordingly, the embodiments of the invention are hardly limited to the examples represented in FIG. 1a through FIG. 1c, FIG. 2a through FIG. 2c, FIG. 3, and FIG. 4. As one example: extension, the signal-space can be expanded to include rates of change (such as velocity and/or acceleration) of calculated from measured values. As another example extension, a HDTP or other high-dimensional gesture user interface arrangement such as those taught in U.S. Pat. No. 6,570,078, U.S. patent application Ser. No. 11/761,978, and U.S. patent application Ser. No. 12/418,605. Such arrangements expand and/or alter the number and/or type of measurements or values calculated from measured values for more arbitrary types of sensors, gesture actions, and signal spaces.

As taught in U.S. patent application Ser. No. 12/418,605, one or more measured or calculated values and/or the rate of change over time of one or more of these measured or calculated values can be individually, in combination, or within a numerical computation, submitted to one or more threshold tests, wherein the outcomes of the threshold tests can be treated as symbols: Accordingly, in a simple implementation, symbols thus created by threshold tests that do not comprise threshold tests on rates of change can be viewed as postures, while symbols created by threshold tests that do comprise threshold tests on rates of change can be viewed as gestures. In more sophisticated implementation, symbols created by threshold tests that comprise threshold tests requiring rates of change to be higher than a reference value can be viewed as gestures, while symbols created by threshold tests that comprise threshold tests requiring rates of change to be lower than a (same of different) reference value can be viewed as postures. U.S. patent application Ser. No. 12/418,605 also teaches that the threshold tests can comprise those wherein the velocity or acceleration of a measured value or calculated value exceeded a specified reference value. Additionally, U.S. patent application Ser. No. 12/418,605 also teaches the generation of symbols by shape recognition functions, and that one or both of threshold tests and shape recognition can be adapted to generate more than one symbol at a time (for example, several conditions may be satisfied at the same moment).

Alternatively, a symbol is determined by the outcome of a vector quantizer applied to one or more measured or calculated value(s) responsive to a user interface sensor.

Alternatively, a symbol is determined by the outcome of a matched filter applied to one or more measured or calculated value(s) responsive to a user interface sensor.

In general, each individual gesture comprises some sort of gesture-beginning and corresponding gesture-end. For example, in one embodiment a gesture-beginning can be defined as the event of the beginning of measured contact with a touch sensor for a contiguous interval of time and the corresponding gesture-end can be defined as the event of the ending of measured contact with a touch sensor for that contiguous interval of time. As another example, in an embodiment a gesture-beginning can be defined as the event of the rate of change of at least one measured or calculated value exceeding a reference value and the corresponding gesture-end can be defined as the event of the rate of change of at least one measured or calculated value dropping below a (same or different) reference value. As yet another example, aspects of the two preceding embodiments can be logically combined, for example using a logic operation (such as "AND" or "OR") on measured contact events and rate of change events. As yet another example, in an embodiment a gesture-beginning can be defined as the event of generation of a designated symbol and the corresponding gesture-end can be defined as the event of generation of a (same or different) designated symbol. As yet another example, aspects of the last embodiment and first two preceding embodiments can be logically combined, for example using a logic operation (such as "AND" or "OR") on two or more measured contact events, rate of change events, and symbol generation events.

2. Gesture Compositions and Deconstructions with Respective to Primitive Elements The notion of tactile grammars is taught in U.S. Pat. No. 6,570,078, U.S. patent application Ser. Nos. 11/761,978 and 12/418,605, and U.S. Patent Provisional Application 61/449,923.

Various broader and more detailed notions of touch gesture and other gesture linguistics in human user interfaces are taught in U.S. patent application Ser. No. 12/418,605 and U.S. Patent Provisional Application 61/449,923.

Figure 5:
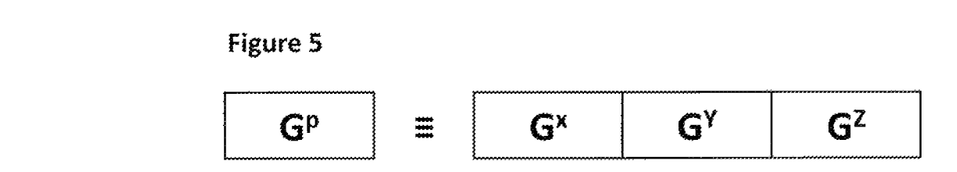
FIG. 5 depicts an example representation of a gesture comprising a sequence of primitive (lower-level) gestures.

Among the gesture linguistic concepts taught U.S. patent application Ser. No. 12/418,605 is that a sequence of symbols can be directed to a state machine to produce other symbols that serve as interpretations of one or more possible symbol sequences: This provides one embodiment of an approach wherein (higher-level) gestures are constructed from primitive elements, in this case, other (lower-level) gestures. In such an arrangement, a predefined gesture can comprise a specific sequence of plurality of other gestures. For example FIG. 5 depicts an example representation of a predefined gesture comprising a specific sequence of three other gestures. Similarly, a predefined gesture comprising a specific sequence of two other gestures, or a predefined gesture comprising a specific sequence of four or more other gestures.

Figure 6:
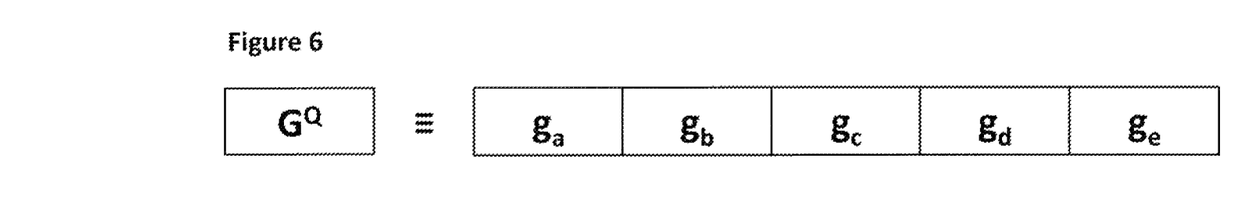
FIG. 6 depicts an example representation of a gesture comprising a sequence of gestemes.

Among the gesture linguistic concepts taught therein is the U.S. Patent Provisional Application 61/449,923 of gestures from primitive elements the inventor refers to as "gestemes" (in analogy with the notion of "phonemes" in speech and "graphemes" in written text). These gestemes need not be recognized as gestures themselves, although this is certainly not precluded. This provides another embodiment of an approach wherein gestures are constructed from primitive elements, in this case gestemes. In an embodiment, a specific predefined gesture comprises a particular sequence of gestemes. FIG. 6 depicts an example representation of a predefined gesture comprising a sequence of five recognized gestemes. Similarly, a predefined gesture can comprise a specific sequence of two, three, or four gestemes, or a predefined gesture can comprise a specific sequence of six or more other gestemes. Additionally, in some arrangements a predefined gesture can comprise a single gesteme.

In an embodiment, a recognized gesteme can comprise a symbol produced by one or more threshold test(s) applied to one or more measured or calculated value(s) responsive to a user interface sensor.

In an embodiment, a recognized gesteme can comprise a sequence of symbols produced by one or more threshold test(s) applied to one or more measured or calculated value(s) responsive to a user interface sensor.

In an embodiment, a recognized gesteme can comprise a symbol produced by a state machine, the state machine responsive to a sequence of symbols produced by one or more threshold test(s) applied to one or more measured or calculated value(s) responsive to a user interface sensor.

In an embodiment, a recognized gesteme is determined by the outcome of a vector quantizer applied to one or more measured or calculated value(s) responsive to a user interface sensor.

In an embodiment, a recognized gesteme is determined by the outcome of a matched filter applied to one or more measured or calculated value(s) responsive to a user interface sensor.

3. Interrupted Execution of a Gesture

The execution of a gesture can be interrupted by the user executing it. The executed gesture can be resumed or not resumed (i.e., abandoned).

In an embodiment, a partially-executed gesture can be recognized as such and information regarding the partially-executed gesture (as measured and/or subsequently-interpreted) is stored.

In an embodiment, should the partially-executed gesture be resumed, the stored information regarding the partially-executed gesture is used in the recognition of the completed form of the previously partially-executed gesture.

In an embodiment, should the partially-executed gesture not be resumed, the stored information regarding the partially-executed gesture is deleted.

In an embodiment, should the partially-executed gesture not be resumed within a pre-determined length of time, the stored information regarding the partially-executed gesture is deleted.

4. Interruption of the Execution of a First Predefined Gesture with the Execution of a Second Predefined Gesture The present invention pertains to a particular special case of the above wherein the execution of a first predefined gesture is interrupted, a predefined second gesture is then fully executed, and the execution of the first predefined gesture is resumed and completed.

Additionally, the present invention pertains to an extension of the above wherein the execution of a first predefined gesture is interrupted, a sequence of a plurality of other predefined gestures are then fully executed, and the execution of the first predefined gesture is resumed and completed.

The case of the present invention is distinguished from the case of the above wherein the execution of a first predefined gesture is interrupted, one or more gestemes not collectively recognized as gesture are then executed, and the execution of the first predefined gesture is resumed and completed. If the interruption is used linguistically as an affix to the first gesture, the latter case amounts to the "infix" or "transfix" cases of an "affix" in the context of gesture grammars as taught in co-pending U.S. patent application Ser. No. 13/414,705 entitled "General User Interface Gesture Lexicon and Grammar Frameworks for Multi-Touch, High Dimensional Touch Pad (HDTP), Free-Space Camera, and Other User Interfaces" by Lester F. Ludwig, filed on Mar. 7, 2012.

Figure 7A:
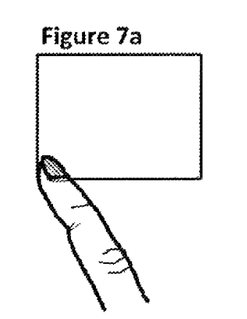
FIG. 7a through FIG. 7j depict an example representation of the execution of a first example predefined gesture is that is interrupted, the full execution of an example second predefined gesture, and the resumed and completed execution of the first predefined gesture.
Figure 7B:
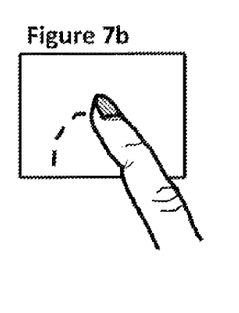
Figure 7C:
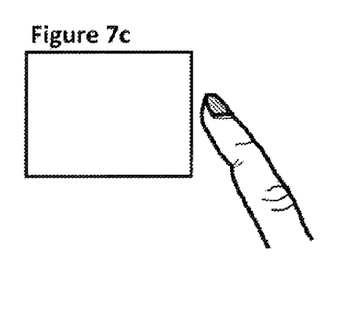
Figure 7D:
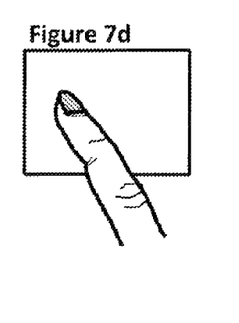
Figure 7E:
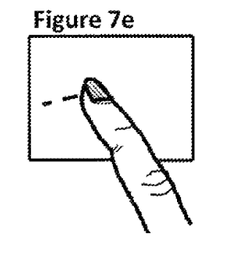
Figure 7F:
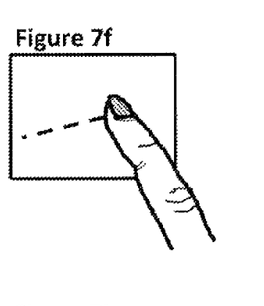
Figure 7G:
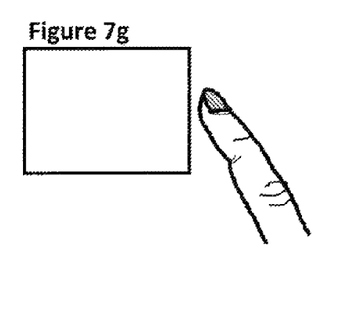
Figure 7H:
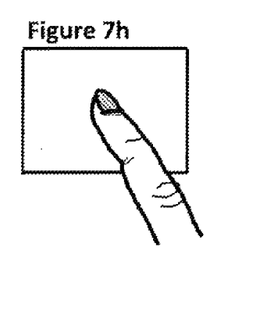
Figure 7I:
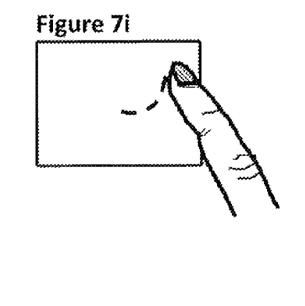
Figure 7J:
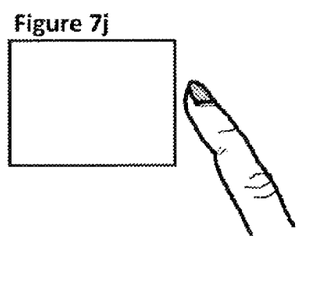

As an example, FIG. 7a through FIG. 7j depicts an example representation of the execution of a first example predefined gesture that is begun (FIG. 7a) and interrupted (FIG. 7b and FIG. 7c), the full execution of an example second predefined gesture (FIG. 7d, FIG. 7e, FIG. 7f, and FIG. 7g), and the resumed and completed execution of the first predefined gesture (FIG. 7h, FIG. 7i, and FIG. 7j).

In this example as described thus far, recognition of the interruption of the execution the first gesture is established at least by the lift-off of the finger from the touch surface depicted in FIG. 7c. Recognition of the interruption of the execution the first gesture can also or alternatively require semantic restrictions on gesteme sequences for predefined gestures. In either version (pause version or semantic restriction version) of this variation where the FIG. 7c lift-off is skipped, the second gesture must begin at the same location where the first gesture was interrupted. Note by including the FIG. 7c lift-off, the location of the beginning of the second gesture need not be influenced by the location where the first gesture was interrupted.

Similarly, in an embodiment the lift-off of the finger from the touch surface depicted in FIG. 7g can be used to signify the completion of the second gesture and the prompt for the completion of the first gesture. In a variation of this example, the lift-off of the finger from the touch surface depicted in FIG. 7g can be omitted; instead a pause can be used to signify the completion of the second gesture and the prompt for the completion of the first gesture, or semantic restrictions on gesteme sequences can be used to signify the completion of the second gesture and the prompt for the completion of the first gesture. In either version (pause version or semantic restriction version) of this variation where the FIG. 7g lift-off is skipped, the resumption of the first interrupted gesture must begin at the same location where the second gesture ended. Note by including the FIG. 7g lift-off, the location of the resumption of the first interrupted gesture need not be influenced by the location where the second gesture was completed.

Similarly, in an embodiment the lift-off of the finger from the touch surface depicted in FIG. 7j can be used to signify the completion of the first gesture. In a variation of this example, the lift-off of the finger from the touch surface depicted in FIG. 7j can be omitted; instead a pause can be used to signify the completion of the first gesture, or semantic restrictions on gesteme sequences can be used to signify the completion of the first gesture.

Figure 8A:
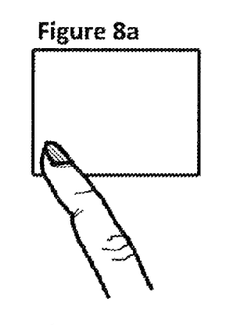
FIG. 8a through FIG. 8j depict a variation on the example of FIG. 7a through FIG. 7j wherein the lift-off events depicted by FIG. 7c, FIG. 7g, and FIG. 7j are replaced with the pause events depicted in FIG. 8c with FIG. 8d, FIG. 8g with FIG. 8h, and in FIG. 8j.
Figure 8B:
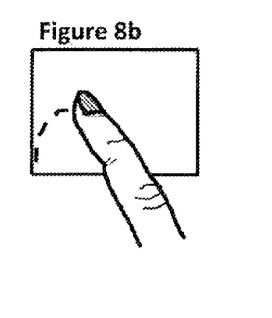
Figure 8C:
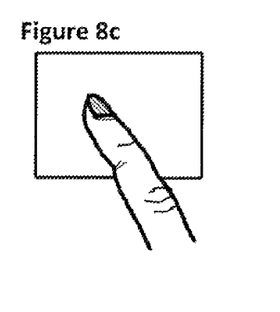
Figure 8D:
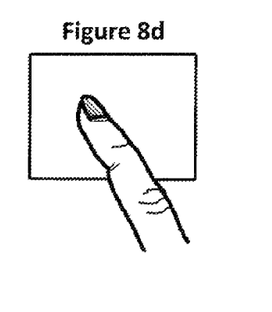
Figure 8E:
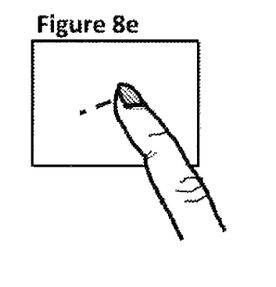
Figure 8F:
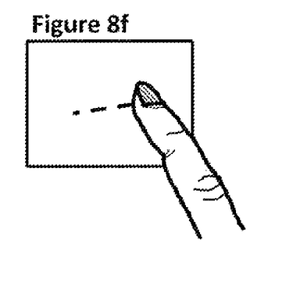
Figure 8G:
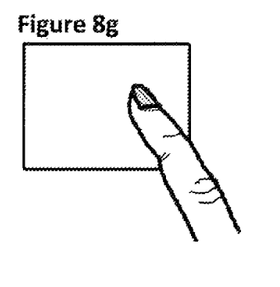
Figure 8H:
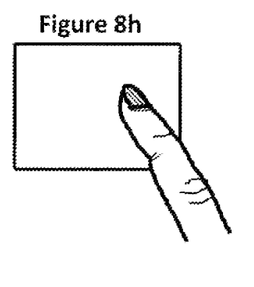
Figure 8I:
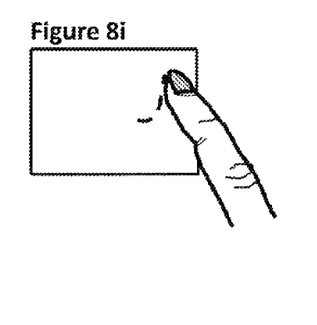
Figure 8J:
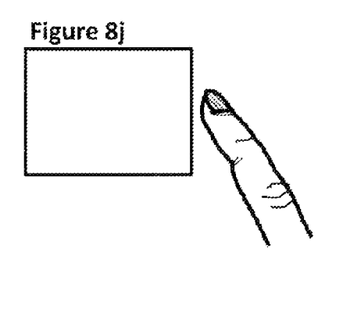
Figure 9A:
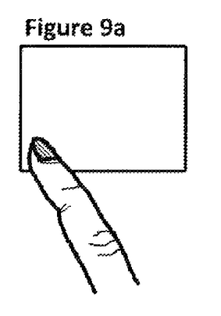
FIG. 9a through FIG. 9f depicts a variation on the example of FIG. 7a through FIG. 7i wherein the lift-off events depicted by FIG. 7c, FIG. 7g, and FIG. 7j are omitted altogether and semantic restrictions on gesteme sequences can be used to signify the completion of the second gesture and the prompt for the completion of the first gesture.
Figure 9B:
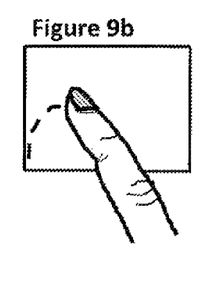
Figure 9C:
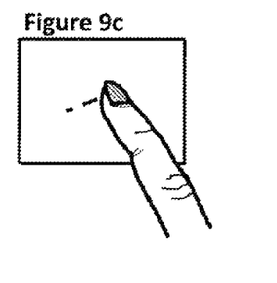
Figure 9D:
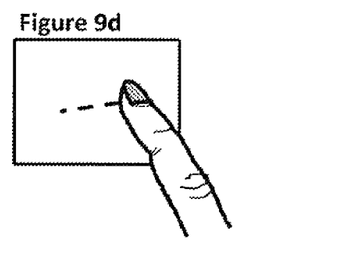
Figure 9E:
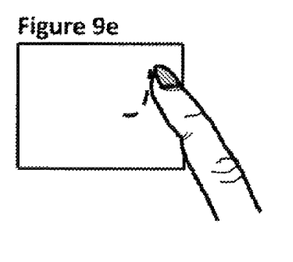
Figure 9F:
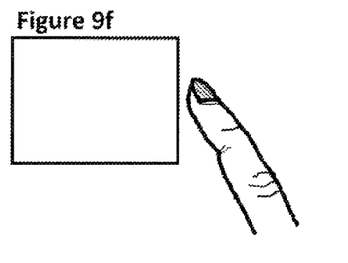

As a second example, FIG. 8a through FIG. 8j depict a variation on the example of FIG. 7a through FIG. 7j wherein the lift-off events depicted by FIG. 7c, FIG. 7g, and FIG. 7j are replaced with the pause events depicted in FIG. 8c with FIG. 8d, FIG. 8g with FIG. 8h, and in FIG. 8j. Such pause events can be recognized by conditions wherein the magnitude of the rate-of-change of one or more measured values or the magnitude of the rate-of-change of one or more values calculated from one or more measured values fall below associated reference threshold(s). In another variation of this example, the lift-off of the finger from the touch surface depicted in FIG. 8j is not used; instead semantic restrictions on gesteme sequences can be used to signify the completion of the second gesture and the prompt for the completion of the first gesture.

As a third example, FIG. 9a through FIG. 9f depict a variation on the example of FIG. 7a through FIG. 7i wherein the lift-off events associated FIG. 7c, FIG. 7g, and FIG. 7j are omitted altogether and semantic restrictions on gesteme sequences can be used to signify the completion of the second gesture and the prompt for the completion of the first gesture. For this example, the second gesture must begin at the same location where the first gesture was interrupted, and the resumption of the first interrupted gesture must begin at the same location where the second gesture ended.

In an embodiment, a method is provided for a user interface recognizing the interruption of the execution of a first gesture with the execution of a second gesture, the method comprising:

Receiving measured information from a user interface sensor, the measured information responsive to user interaction actions made by a user;

Applying at least one operation to the measured information to produce a sequence of symbols, each symbol produced by the at least one operation responsive to an associated portion of a user interaction actions made by the user;

Determining from the sequence of symbols that the user's execution a first gesture has been interrupted;

Determining from the sequence of symbols that the user's execution a second gesture has been started and completed before the first gesture has been resumed; and Determining from the sequence of symbols that the user's execution a first gesture has been completed;

wherein the first gesture is recognized and the second gesture is recognized.

As a second example, in the gesteme implementation of gestures, a first gesture $G^A$ comprises a first sequence, of m gestemes $\{g_1^A, \ldots, g_m^A\}$ and a second gesture $G^B$ comprises a second sequence of n gestemes $\{g_1^B, \ldots, g_n^B\}$. More explicitly, this includes the following cases for the composite sequence of gestemes:

$\{g_1^A, g_1^B, \ldots, g_n^B, g_2^A\}$ where m=2 and n>1;
$\{g_1^A, g_1^B, \ldots, g_n^B, g_2^A, \ldots, g_m^A\}$ where m>2 and n>1;
$\{g_1^A, \ldots, g_{m-1}^A, g_1^B, \ldots, g_n^B, g_m^A\}$ wherein m>2 and n>1;
$\{g_1^A, \ldots, g_k^A, g_1^B, \ldots, g_n^B, g_{k+1}^A, \ldots g_m^A\}$ where m>3, 1<k<(m−1), and n>1;
$\{g_1^A, g_1^B, g_2^A, g_2^A\}$ where m=2 and n=1;
$\{g_1^A, g_1^B, g_2^A, \ldots, g_m^A\}$ where m>2 and n=1;
$\{g_1^A, \ldots, g_{m-1}^A, g_1^B, g_m^A\}$ where m>2 and n=1;
$\{g_1^A, \ldots, g_k^A, g_1^B, g_{k+1}^A, \ldots, g_m^A\}$ where m>3, 1<k<(m−1), and n=1.

Note that cases with n=1 are those wherein the second gesture comprises only one gesteme. Also note that cases with m=1 are not admissible since the first gesture must be interrupted and resumed, thus requiring the first gesture to comprise a minimum of two gestemes for the first predefined gesture.

In an embodiment, both the first gesture and second gesture are recognized.

In an embodiment, the existence of any of the above-listed interruption cases is not used to convey semantic content.

The invention provides for various additional operations to be provided based on any two or more of the gesture recognitions, the existence of an interruption in the execution of the first gesture wherein the second gesture is completed during the interruption, details of the interruption, etc.

In another embodiment, the existence of any of the above-listed interruption cases is used to convey semantic content.

In an embodiment, the point of the interruption within the trajectory of the first gesture is not used to convey semantic content.

In an embodiment, the point of the interruption within the trajectory of the first gesture is used to convey semantic content.

In an embodiment, the point of the interruption within the gesteme sequence of the first gesture is not used to convey semantic content.

In an embodiment, the point of the interruption within the gesteme sequence of the first gesture is used to convey semantic content.

In an embodiment, the combination of the first gesture and the second gesture is not used to convey additional semantic content beyond that of the first gesture and the second gesture in isolation.

In an embodiment, the combination of the first gesture and the second gesture is used to convey additional semantic content beyond that of the first gesture and the second gesture in isolation.

In an embodiment, the combination of the first gesture, the second gesture, and the location of the interruption within the first gesture is used to convey additional semantic content beyond that of the first gesture and the second gesture in isolation.

In an embodiment, a method is provided for a user interface recognizing the interruption of the execution of a first gesture with the execution of a second gesture, the method comprising:

Receiving measured information from a user interface sensor, the measured information responsive to user interaction actions made by a user;

Applying at least one operation to the measured information to produce a sequence of gestemes, each gesteme produced by the at least one operation responsive to an associated portion of a user interaction actions made by the user;

Determining from the sequence of gestemes that the user's execution a first gesture has been interrupted;

Determining from the sequence of gestemes that the user's execution a second gesture has been started and completed before the first gesture has been resumed; and Determining from the sequence of gestemes that the user's execution a first gesture has been completed;

wherein the first gesture is recognized and the second gesture is recognized.

Additionally, the above aspects of the present invention can be extended to variation of the above wherein the execution of a first predefined gesture is interrupted, a sequence of a plurality of other predefined gestures are then fully executed, and the execution of the first predefined gesture is then resumed and completed.

More explicitly, in the gesteme implementation of gestures, this includes the following cases for the composite sequence of gestemes:

$\{g_1^A, g_1^{sequence}, \ldots, g_n^{sequence}, g_2^A, g_2^A\}$ where m=2 and n>1;

$\{g_1^A, g_1^{sequence}, \ldots, g_n^{sequence}, g_2^A, \ldots, g_m^A\}$ where m>2 and n>1;

$\{g_1^A, \ldots, g_{m-1}^A, g_1^{sequence}, \ldots, g_n^{sequence}, g_m^A\}$ wherein m>2 and n>1;

$\{g_1^A, \ldots, g_k^A, g_1^{sequence}, \ldots, g_n^{sequence}, g_{k+1}^A, \ldots, g_m^A\}$ where m>3, 1<k<(m−1), and n>1;

Here, the first gesture $G^A$ comprises a first sequence of m gestemes $\{g_1^A, \ldots, g_m^A\}$ and a sequence of a plurality of other predefined gestures $G^{sequence}$ comprises a second sequence of n gestemes $\{g_1^{sequence}, \ldots, g_n^{sequence}\}$, this second sequence being the concatenation of the gesteme sequences for each gesture in the sequence of other predefined gestures.

In an embodiment, all of the first gesture and the sequence of other predefined gestures are individually recognized.

In an embodiment, the existence of any of the above-listed interruption cases is not used to convey semantic content.

The invention provides for various additional operations to be provided based on any gesture recognitions, the existence of an interruption in the execution of the first gesture wherein the sequence of other predefined gestures is completed during the interruption, details of the interruption, etc.

In another embodiment, the existence of any of the above-listed interruption cases is used to convey semantic content.

In an embodiment, the point of the interruption within the trajectory of the first gesture is not used to convey semantic content.

In an embodiment, the point of the interruption within the trajectory of the first gesture is used to convey semantic content.

In an embodiment, the point of the interruption within the gesteme sequence of the first gesture is not used to convey semantic content.

In an embodiment, the point of the interruption within the gesteme sequence of the first gesture is used to convey semantic content.

In an embodiment, the combination of the first gesture and the sequence of other predefined gestures is not used to convey additional semantic content beyond that of the first gesture and the second gesture in isolation.

In an embodiment, the combination of the first gesture and the sequence of other predefined gestures is used to convey additional semantic content beyond that of the first gesture and the second gesture in isolation.

In an embodiment, the combination of the first gesture, the sequence of other predefined gestures, and the location of the interruption within the first gesture is used to convey additional semantic content beyond that of the first gesture and the second gesture in isolation.

The invention can be used with simple touch interface systems found in handheld devices, laptops, and other mobile devices as well as sophisticated touch interface systems such as the High Dimensional Touch Pad (HDTP) taught in U.S. Pat. No. 6,570,078, U.S. patent application Ser. No. 11/761, 978, and U.S. patent application Ser. No. 12/418,605.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

While the invention has been described in detail with reference to disclosed embodiments, various modifications within the scope of the invention will be apparent to those of ordinary skill in this technological field. It is to be appreciated that features described with respect to one embodiment typically can be applied to other embodiments.

The invention can be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

Although exemplary embodiments have been provided in detail, various changes, substitutions and alternations could be made thereto without departing from spirit and scope of the disclosed subject matter as defined by the appended claims. Variations described for the embodiments may be realized in any combination desirable for each particular application. Thus particular limitations and embodiment enhancements described herein, which may have particular advantages to a particular application, need not be used for all applications. Also, not all limitations need be implemented in methods, systems, and apparatuses including one or more concepts described with relation to the provided embodiments. Therefore, the invention properly is to be construed with reference to the claims.

What is claimed is:

1. A method for a user interface recognizing the interruption of the execution of a first gesture with the execution of a second gesture, the method comprising:

receiving measured information from a user interface sensor, the measured information responsive to user interaction actions made by a user;

applying at least one operation to the measured information to produce a sequence of gestemes, each gesteme produced by the at least one operation responsive to an associated portion of a user interaction actions made by the user;

determining from the sequence of gestemes that the user's execution of a first gesture has been interrupted;

determining from the sequence of gestemes that the user's execution of a second gesture has been started and completed before the first gesture has been resumed; and determining from the sequence of gestemes that the user's execution of the first gesture has been completed;

wherein the first gesture is recognized and the second gesture is recognized.

2. The method of claim 1 wherein the recognized interruption of the trajectory of the first gesture is used to convey semantic content.

3. The method of claim 1 wherein point of the interruption within the trajectory of the first gesture is used to convey semantic content.

4. The method of claim 1 wherein the combination of the first gesture and the second gesture is used to convey additional semantic content beyond that of the first gesture and the second gesture in isolation.

5. The method of claim 1 wherein the combination of the first gesture, the second gesture, and the location of the interruption within the first gesture is used to convey additional semantic content beyond that of the first gesture and the second gesture in isolation.

6. The method of claim 1 wherein the at least one operation comprises a threshold test.

7. The method of claim 1 wherein the at least one operation comprises a vector quantization provided by a vector quantizer.

8. The method of claim 1 wherein the at least one operation comprises a matched filter.

9. The method of claim 1 wherein the at least one operation comprises a state machine.

10. The method of claim 1 wherein the second gesture comprises only one gesteme.

11. A method for a user interface recognizing the interruption of the execution of a first gesture with the execution of a second gesture, the method comprising:

receiving measured information from a user interface sensor, the measured information responsive to user interaction actions made by a user;

applying at least one operation to the measured information to produce a sequence of symbols, each symbol produced by the at least one operation responsive to an associated portion of a user interaction actions made by the user;

determining from the sequence of symbols that the user's execution of a first gesture has been interrupted;

determining from the sequence of symbols that the user's execution of a second gesture has been started and completed before the first gesture has been resumed; and determining from the sequence of symbols that the user's execution of the first gesture has been completed;

wherein the first gesture is recognized and the second gesture is recognized.

12. The method of claim 11 wherein the recognized interruption of the trajectory of the first gesture is used to convey semantic content.

13. The method of claim 11 wherein point of the interruption within the trajectory of the first gesture is used to convey semantic content.

14. The method of claim 11 wherein the combination of the first gesture and the second gesture is used to convey additional semantic content beyond that of the first gesture and the second gesture in isolation.

15. The method of claim 11 wherein the combination of the first gesture, the second gesture, and the location of the interruption within the first gesture is used to convey additional semantic content beyond that of the first gesture and the second gesture in isolation.

16. The method of claim 11 wherein the at least one operation comprises a threshold test.

17. The method of claim 16 wherein the at least one operation comprises the threshold tests wherein the velocity or acceleration of a measured value or calculated value exceeded a specified reference value shape recognition.

18. The method of claim 11 wherein the at least one operation comprises shape recognition.

19. The method of claim 11 wherein the at least one operation comprises a state machine.

20. The method of claim 11 wherein the second gesture comprises only one symbol.

* * * * *